US012076593B2

(12) United States Patent
Hung et al.

(10) Patent No.: US 12,076,593 B2
(45) Date of Patent: Sep. 3, 2024

(54) HOLE ANCHOR

(71) Applicant: YOKE INDUSTRIAL CORP., Taichung (TW)

(72) Inventors: Wei-Chieh Hung, Taichung (TW); Ya-Chun Cheng, Changhua County (TW)

(73) Assignee: YOKE INDUSTRIAL CORP., Taichung (TW)

( * ) Notice: Subject to any disclaimer, the term of this patent is extended or adjusted under 35 U.S.C. 154(b) by 0 days.

(21) Appl. No.: 18/133,522

(22) Filed: Apr. 12, 2023

(65) Prior Publication Data

US 2024/0198146 A1 Jun. 20, 2024

(30) Foreign Application Priority Data

Dec. 20, 2022 (TW) ................................. 111148975

(51) Int. Cl.
*A62B 35/00* (2006.01)
*E04G 21/32* (2006.01)

(52) U.S. Cl.
CPC ...... *A62B 35/0068* (2013.01); *E04G 21/3276* (2013.01)

(58) Field of Classification Search
CPC ............ A62B 35/0068; A62B 35/0043; A63B 29/027; A63B 29/02; A63B 29/08; A63B 69/0048; E04G 21/3276; F16B 13/10; F16B 13/0833; F16B 13/0808
See application file for complete search history.

(56) References Cited

U.S. PATENT DOCUMENTS

| | | | | |
|---|---|---|---|---|
| 7,040,588 B2 * | 5/2006 | Lowe | A63B 29/024 | 248/231.9 |
| 8,353,653 B2 * | 1/2013 | Guthrie | A63B 29/024 | 411/401 |
| 9,370,692 B2 * | 6/2016 | Czech | A63B 29/024 | |
| D829,085 S * | 9/2018 | Daly | D8/382 | |
| 10,465,729 B2 * | 11/2019 | Daly | F16B 13/0808 | |
| 2005/0104385 A1 * | 5/2005 | Guthrie | E04G 21/3261 | 292/247 |
| 2011/0085873 A1 * | 4/2011 | Guthrie | A63B 29/024 | 411/340 |
| 2011/0225793 A1 * | 9/2011 | Daniels, III | A63B 29/024 | 248/231.9 |
| 2018/0001175 A1 * | 1/2018 | Davidson | A63B 29/08 | |

* cited by examiner

*Primary Examiner* — Eret C McNichols

(74) *Attorney, Agent, or Firm* — Apex Juris, pllc; Hilde M. L. Coeckx

(57) ABSTRACT

A hole anchor has a plug. An anchor shaft and a cord respectively pass through a center and a periphery of the plug. A top end and a bottom end of the anchor shaft respectively have a head and an annular structure. A spring is disposed between the annular structure and the plug. Two side rods of an anchor head assembly are juxtaposed respectively on a left side and a right side of the head. Two sides of each of the side rods respectively have a closed end and an open end. The two closed ends are engaged with each other via a concave-convex structure. A top side of each of the two open ends is pivotally connected to a pin connected to the cord. A pivot unit pivotally penetrates a middle of the two side rods and the head.

12 Claims, 7 Drawing Sheets

HOLE ANCHOR

BACKGROUND OF THE INVENTION

Technical Field

The present invention relates generally to an anchor structure adapted to be engaged with a safety equipment, and more particularly to a hole anchor.

Description of Related Art

A conventional hole anchor includes an anchor shaft and a cord respectively passing through a plug, wherein a top end of the anchor shaft is pivotally connected to an anchor head that could be rotated by pulling the cord. After the plug and the anchor head are inserted into a hole, the anchor shaft is pulled to make the anchor head rubbing against a hole wall to rotate for restoring to its original position and being stuck at the hole for fixing, and an annular body of a bottom end of the anchor shaft is adapted to be engaged with a snap hook of a safety equipment.

Although the conventional hole anchor has a function of disposing in the hole for fixing, the anchor head is a monolithic column, thereby during manufacturing, not only an inner portion of the anchor head is required to be processed to form a through hole for the anchor shaft and an end portion of the cord to enter, but another through hole of an axis is also required to be processed for being pivotally connected to the anchor head and disposing a cord head. A manufacturing way of processing from an inner side of the anchor head is more complicated, and matching a hole with another hole during assembling is difficult, making assembling components to be time-consuming.

BRIEF SUMMARY OF THE INVENTION

In view of the above, the primary objective of the present invention is to provide a hole anchor, wherein an anchor head of the hole anchor is constituted by engaging a left side rod with a right side rod, thereby components of the anchor head could be easily processed and manufactured and could be easily assembled and pivotally connected to a head of an anchor shaft.

The present invention provides a hole anchor including a plug, an anchor shaft, an anchor head assembly, and a guiding cord. A center and a periphery of the plug respectively have a through hole and a cord hole. The anchor shaft passes through the through hole and has an annular structure on a bottom end and a head on a top end of the anchor shaft, wherein the head has an axial hole penetrating along a left-right direction. A spring fits around a periphery of the anchor shaft, wherein a top end and a bottom end of the spring respectively abut against the plug and the annular structure.

The anchor head assembly includes a first side rod, a second side rod, and a pivot unit, wherein the first side rod and the second side rod are juxtaposed to each other. The first side rod has a first closed end and a first open end opposite to the first closed end, wherein a first recess is recessed into an inner surface of a middle of the first side rod facing the second side rod. A first hole penetrates through the middle of the first side rod along the left-right direction. A top side of the first open end has a first pin base, wherein an inner surface of the first pin base facing the second side rod has a first pin groove. A portion of the first open end adjacent to a bottom side of the first pin base has a first recessed opening.

The second side rod has a second closed end and a second open end opposite to the second closed end, wherein a second recess is recessed into an inner surface of a middle of the second side rod facing the first side rod. The head is disposed between the first recess and the second recess. The second closed end is engaged with the first closed end via a concave-convex structure. A second hole penetrates through the middle of the second side rod along the left-right direction. A top side of the second open end has a second pin base. A gap is formed between the second pin base and the first pin base. An inner surface of the second pin base facing the first side rod has a second pin groove. A portion of the second open end adjacent to a bottom side of the second pin base has a second recessed opening. The pivot unit pivotally penetrates through the first hole, the axial hole, and the second hole for fixing. The guiding cord includes a pin and a cord, wherein two ends of the pin respectively pass through the first pin groove and the second pin groove. A top end of the cord passes through the gap to be engaged with the pin, and a bottom end of the cord passes downward out of the cord hole of the plug.

Upon using the present invention, the cord is pulled downward to make the first side rod and the second side rod of the anchor head assembly to simultaneously rotate around the pivot unit to be in an inclined state. During the rotating process, a part of the anchor shaft is moved to be between the first recessed opening and the second recessed opening, thereby the anchor head assembly could rotate to a greater rotating degree. Then the anchor head assembly is placed in a hole and the plug is plugged into the hole. The cord is suitably manipulated to make the first side rod and the second side rod of the anchor head assembly to rub against a hole wall of the hole, and at the same time the anchor shaft is pulled in a direction away from the hole, making the anchor head assembly that is rubbing against the hole wall to rotateto restore to its original position and to be stuck at the hole for fixing, and the annular structure is adapted to be engaged with a snap hook of a safety equipment.

With the aforementioned design, the first side rod and the second side rod juxtaposed to each other not only divide a conventional anchor head into two parts, the inner side of the first side rod and the inner side of the second side rod form the structures including the recesses and the recessed openings, wherein the first recess on the left side and the second recess on the right side constitute the room for the head of the anchor shaft to enter, and the first recessed opening on the left side and the second recessed opening on the right side constitute another room for receiving the part of the anchor shaft. The gap is formed between the pin bases for the cord to enter and be engaged with the pin. The first closed end is engaged with the second closed end via the concave-convex structure to make the first side rod to be operatively coupled with the second side rod. As the recess and the recessed opening of each of the side rods are located on the surface of the side rod, components could be easily manufactured and could easily match a hole with another hole during assembling, saving time and avoiding troubles during assembling.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
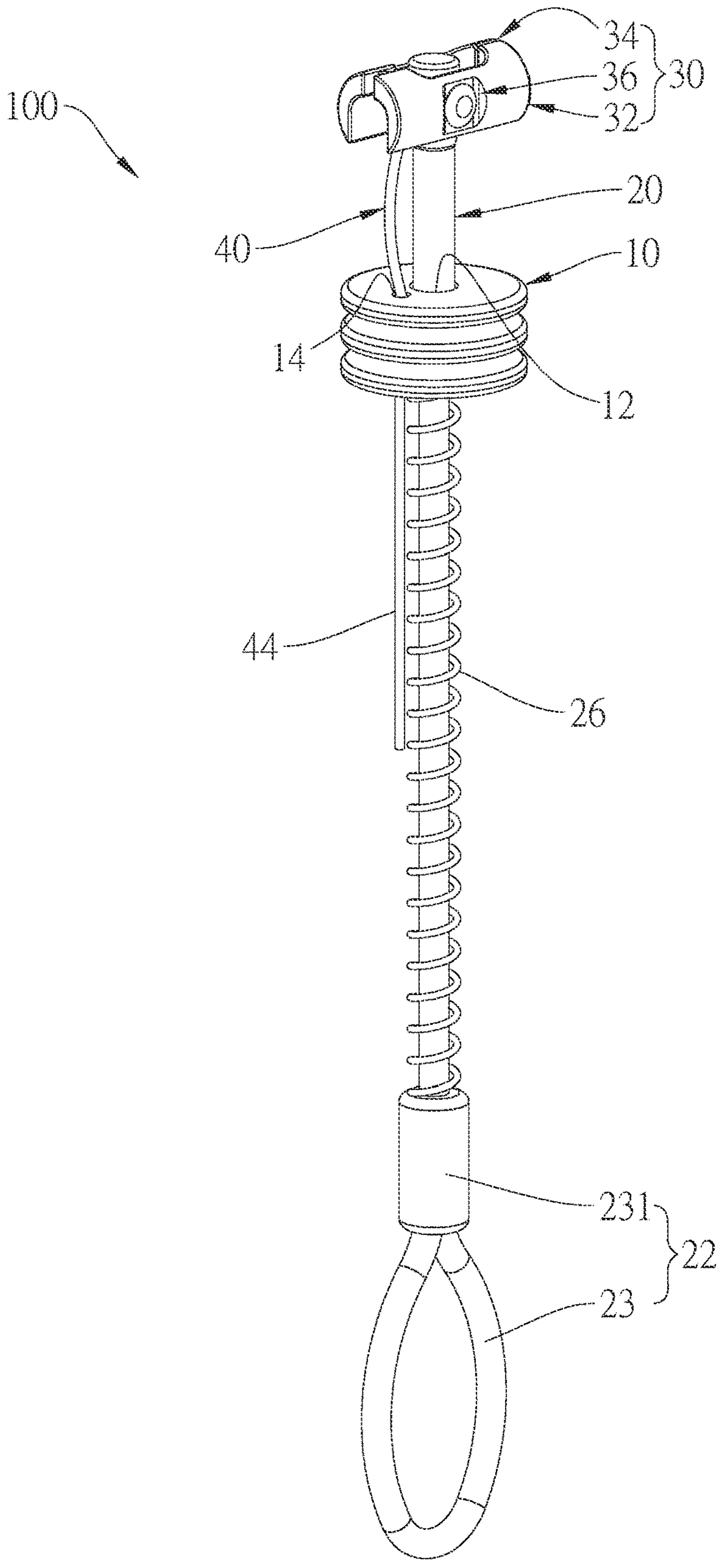
FIG. 1 is a perspective view of the hole anchor according to an embodiment of the present invention.
Figure 2:
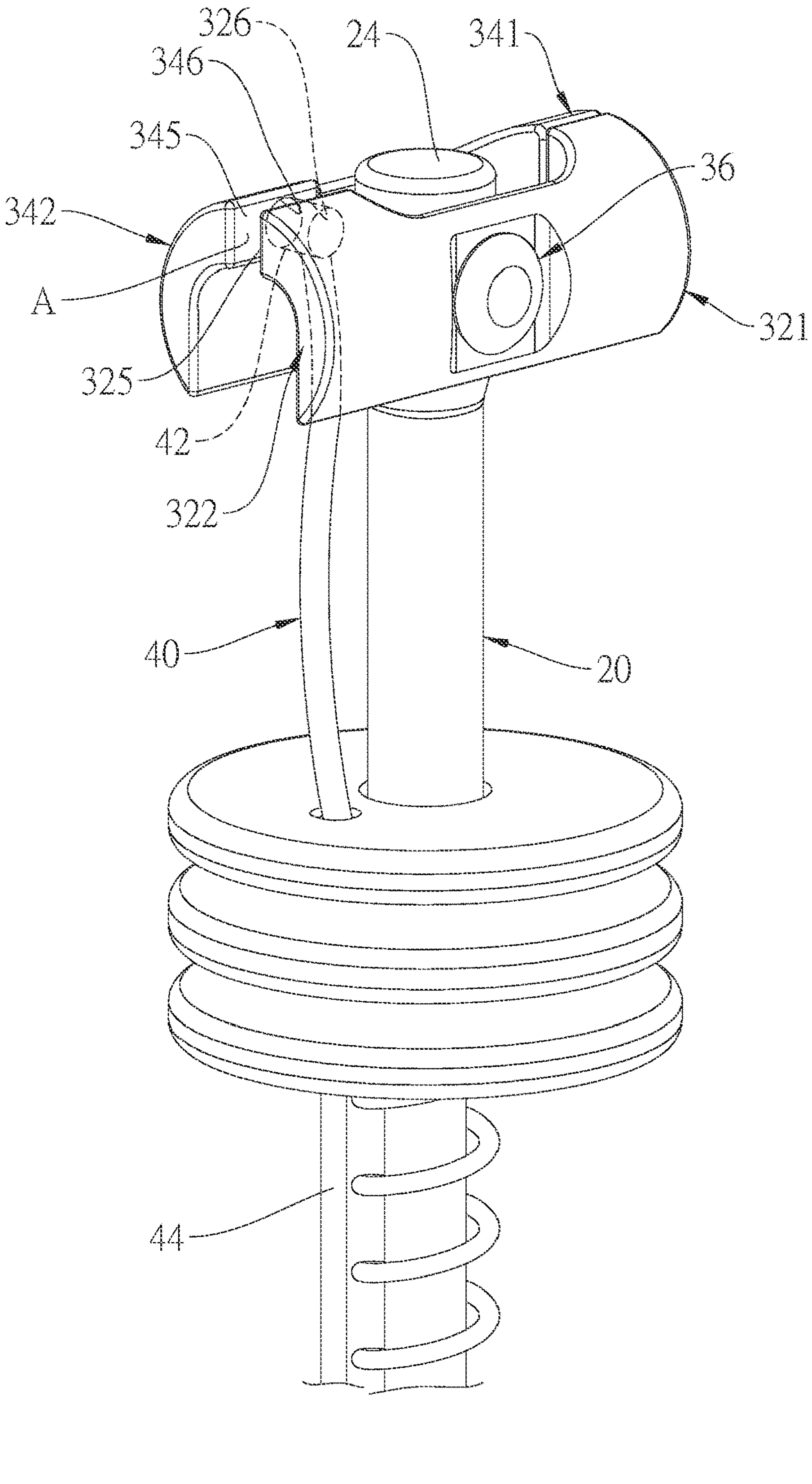
FIG. 2 is a partially perspective view of FIG. 1, showing the top side of the hole anchor.
Figure 3:
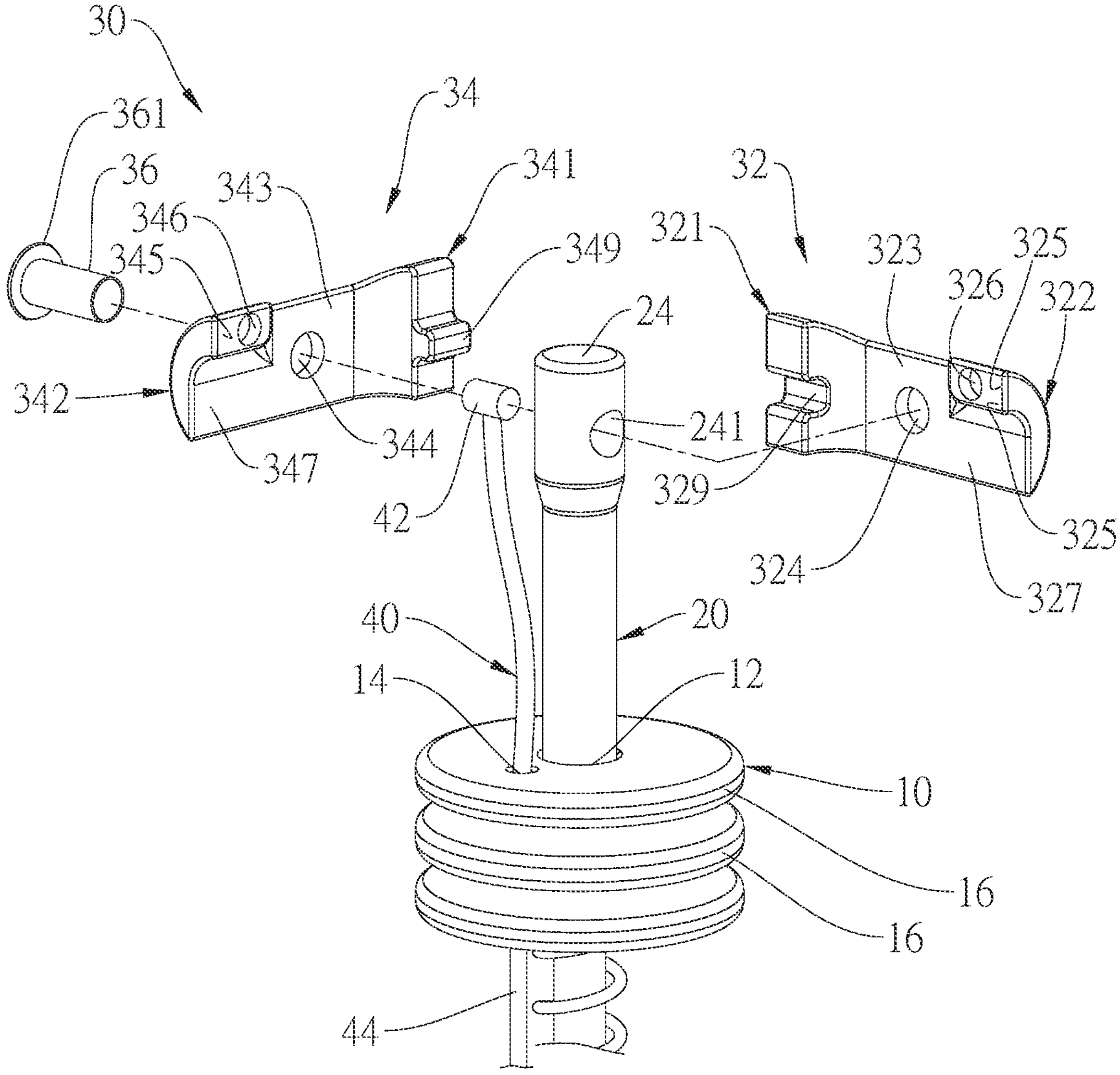
FIG. 3 is a partially exploded view of the structure shown in FIG. 2.
Figure 4:
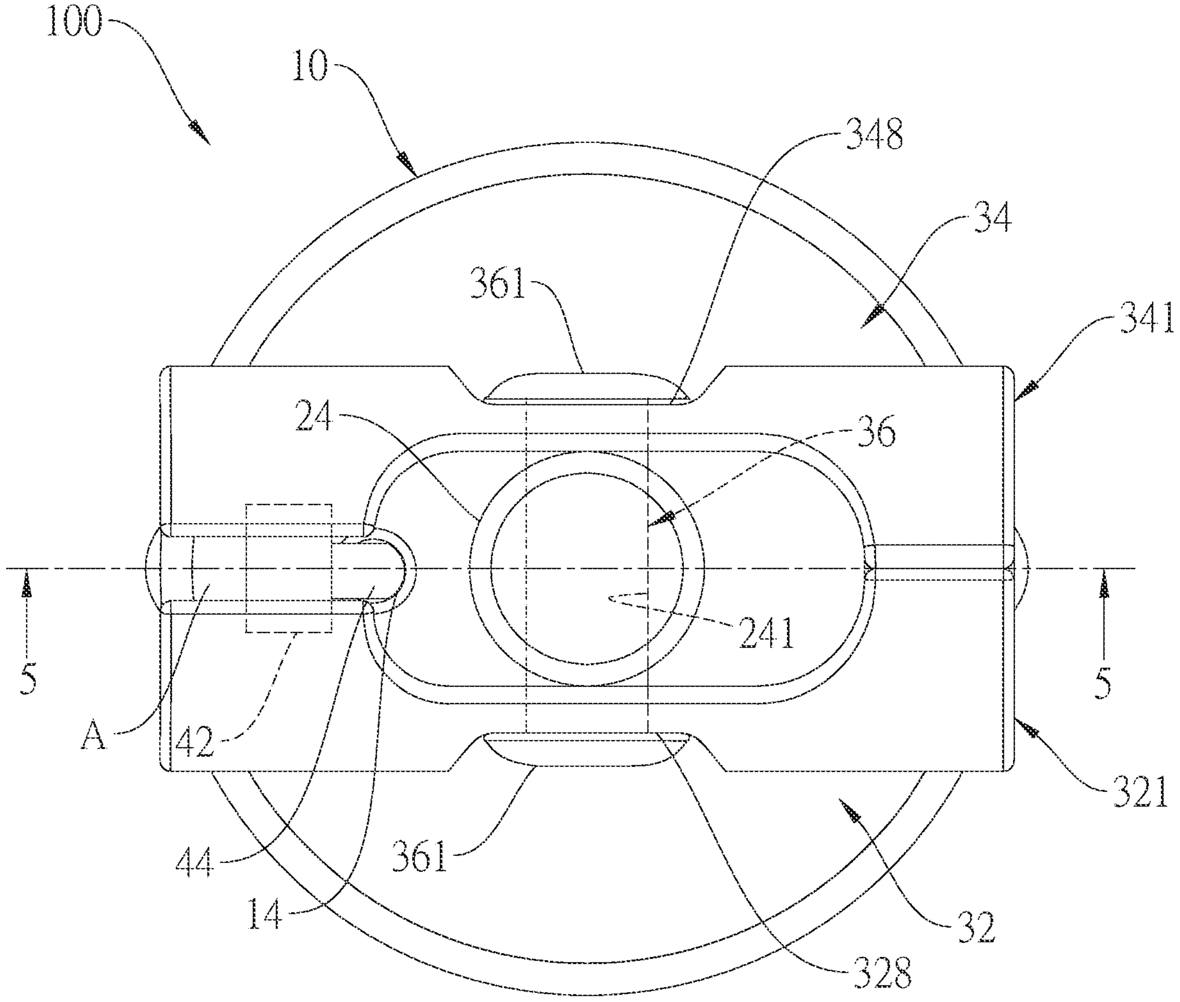
FIG. 4 is a top view of the hole anchor according to the embodiment of the present invention.
Figure 5:
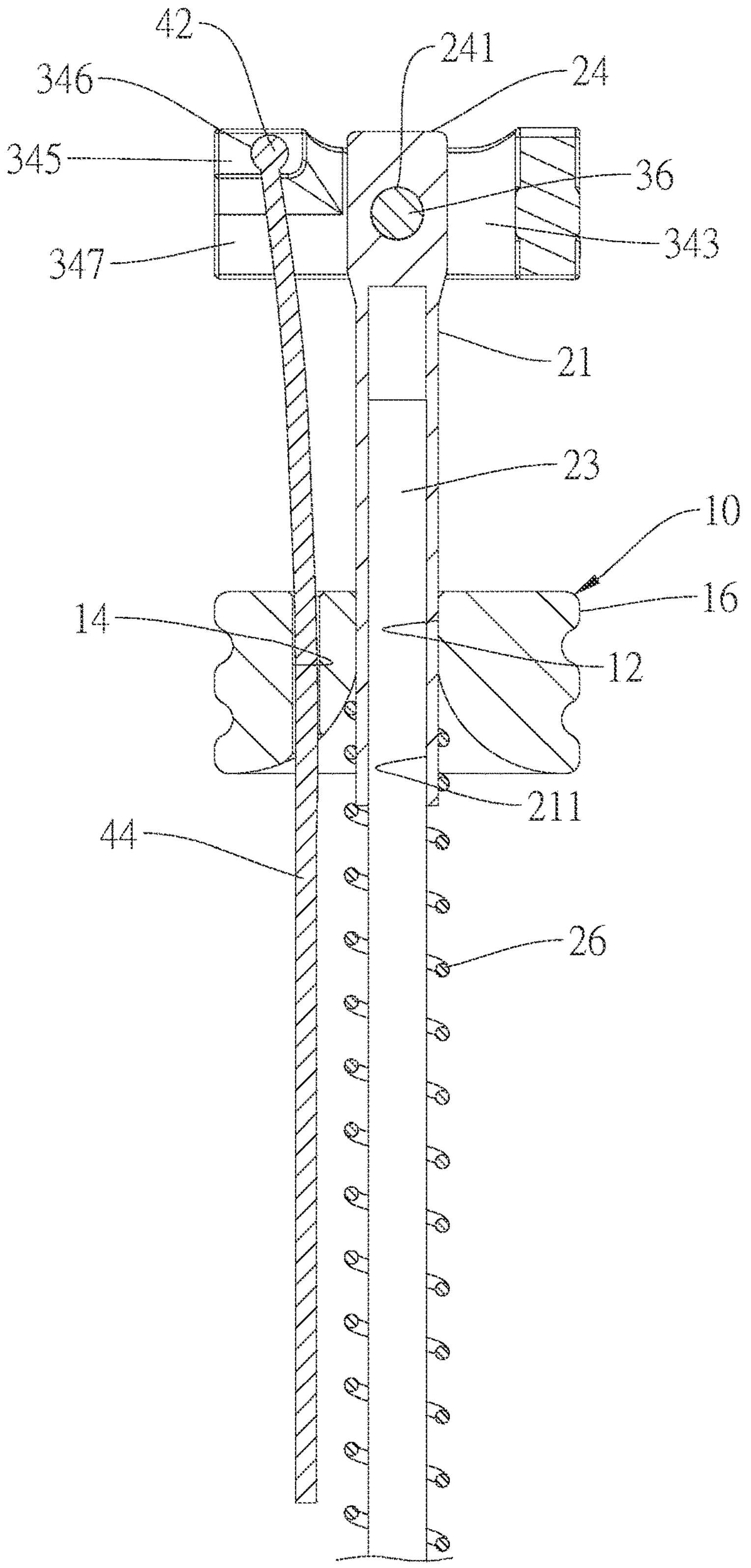
FIG. 5 is a sectional view along the 5-5 line in FIG. 4.
Figure 6:
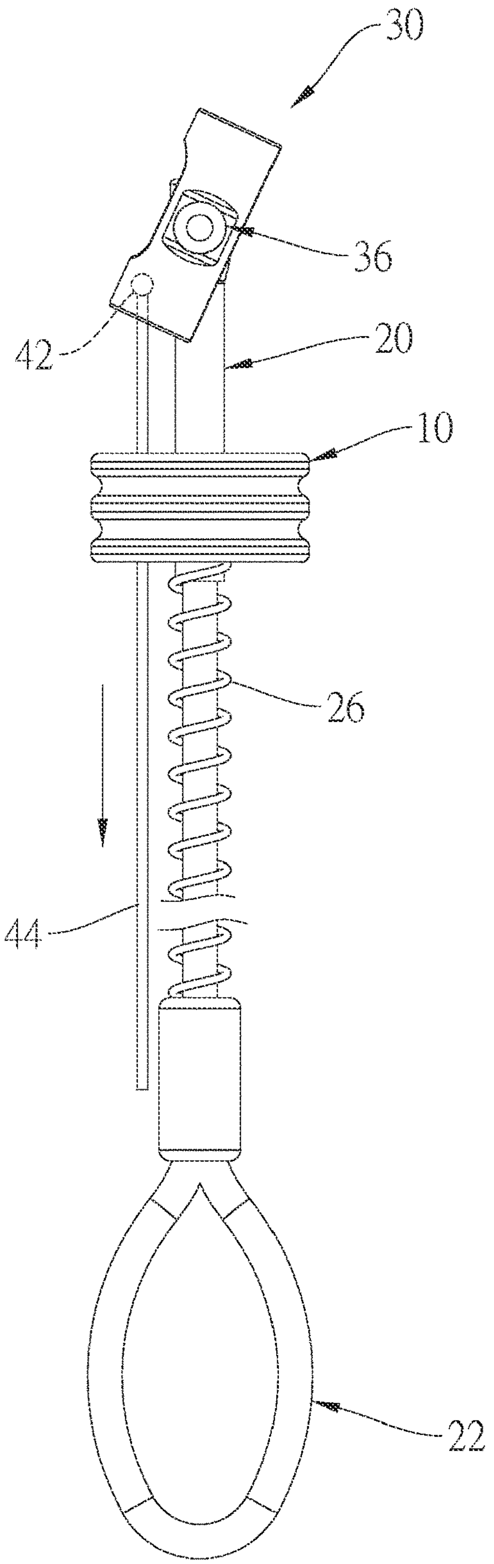
FIG. 6 is a schematic view, showing that the anchor head assembly according to the embodiment of the present invention is rotated to be in the inclined state.

A hole anchor 100 according to an embodiment of the present invention is illustrated in FIG. 1 to FIG. 5 and includes a plug 10, an anchor shaft 20, an anchor head assembly 30, and a guiding cord 40.

A center and a periphery of the plug 10 respectively have a through hole 12 and a cord hole 14 respectively extending along a top-bottom direction.

The anchor shaft 20 passes through the through hole 12 and has an annular structure 22 on a bottom end and a head 24 on a top end of the anchor shaft 20, wherein the head 24 has an axial hole 241 penetrating along a left-right direction perpendicular to the top-bottom direction. A spring 26 fits around a periphery of the anchor shaft 20, wherein a top end and a bottom end of the spring 26 respectively abut against the plug 10 and the annular structure 22.

The anchor head assembly 30 includes a first side rod 32, a second side rod 34, and a pivot unit 36, wherein the first side rod 32 and the second side rod 34 are respectively juxtaposed on two sides of the head 24, and the pivot unit 36 is adapted to rotatably penetrate through the first side rod 32, the second side rod 34, and the head 24. In the current embodiment, the first side rod 32 is a half cylinder extending along a front-rear direction respectively perpendicular to the top-bottom direction and the left-right direction, wherein an outer surface of the first side rod 32 away from the second side rod 34 is a curved surface of the half cylinder; the second side rod 34 is a half cylinder extending along the front-rear direction, wherein an outer surface of the second side rod 34 away from the first side rod 32 is a curved surface of the half cylinder. In other embodiments, the first side rod 32 and the second side rod 34 could respectively be a half cube or other half polygonal prisms.

A front end of the first side rod 32 has a first open end 322 and a rear end of the first side rod 32 has a first closed end 321 opposite to the first open end 322. A first recess 323 is recessed into an inner surface of a middle of the first side rod 32 facing the second side rod 34. A first hole 324 penetrates through the middle of the first side rod 32 along the left-right direction and a middle of the first recess 323. A top side of the first open end 322 has a first pin base 325, wherein an inner surface of the first pin base 325 facing the second side rod 34 is shortened to be away from a junction between the first side rod 32 and the second side rod 34, and a shortened depth of the first pin base 325 in the left-right direction is smaller than a recessing depth of the first recess 323 recessed into the inner surface of the middle of the first side rod 32 in the left-right direction. The inner surface of the first pin base 325 has a first pin groove 326. A portion of the first open end 322 adjacent to a bottom side of the first pin base 325 has a first recessed opening 327.

A front end of the second side rod 34 has a second open end 342 and a rear end of the second side rod 34 has a second closed end 341 opposite to the second open end 342. A second recess 343 is recessed into an inner surface of a middle of the second side rod 34 facing the first side rod 32. The head 24 of the anchor shaft 20 is disposed between the second recess 343 and the first recess 323. The second closed end 341 is engaged with the first closed end 321 via a concave-convex structure, making the first closed end 321 of the first side rod 32 and the second closed end 341 of the second side rod 34 to be unable to be detached from each other in the top-bottom direction. A second hole 344 penetrates through the middle of the second side rod 34 along the left-right direction and a middle of the second recess 343. A top side of the second open end 342 has a second pin base 345, wherein an inner surface of the second pin base 345 facing the first side rod 32 is shortened to be away from a junction between the first side rod 32 and the second side rod 34, and a shortened depth of the second pin base 345 in the left-right direction is smaller than a recessing depth of the second recess 343 recessed into the inner surface of the second side rod 34 in the left-right direction, thereby forming a gap A between the inner surface of the second pin base 345 and the inner surface of the first pin base 325. The inner surface of the second pin base 345 has a second pin groove 346. A portion of the second open end 342 adjacent to a bottom side of the second pin base 345 has a second recessed opening 347. The first recessed opening 327 and the second recessed opening 347 constitute a room for receiving a side of the anchor shaft 20 opposite to the spring 26.

The pivot unit 36 pivotally penetrates through the first hole 324, the axial hole 241 of the head 24, and the second hole 344 for fixing, thereby the first side rod 32 and the second side rod 34 could rotate around the pivot unit 36 to be in an inclined state or to restore to a horizontal state. In the current embodiment, the pivot unit 36 is a rivet having two fixing heads 361 respectively on two opposite ends of the rivet, wherein the two fixing heads 361 are respectively engaged with the first side rod 32 and the second side rod 34.

The pivot unit 36 are matched with the first side rod 32 and the second side rod 34. More specifically, a middle of an outer surface of the first side rod 32 away from the second side rod 34 has a first side recess 328, wherein an inner side of the first side recess 328 is a flat surface, and the first hole 324 penetrates through a middle of the first side recess 328. A middle of an outer surface of the second side rod 34 away from the first side rod 32 has a second side recess 348, wherein an inner side of the second side recess 348 is a flat surface, and the second hole 344 penetrates through a middle of the second side recess 348. The two fixing heads 361 of the pivot unit 36 are respectively engaged with the inner side of the first side recess 328 and the inner side of the second side recess 348 for positioning. In the current embodiment, the pivot unit 36 is the rivet. However, in other embodiments, the pivot unit 36 could be a bolt and nut assembly as well.

The guiding cord 40 includes a pin 42 and a cord 44, wherein two ends of the pin 42 respectively pass through the first pin groove 326 and the second pin groove 346. The pin 42 could rotate around an axis of the pin 42 in the first pin groove 326 and the second pin groove 346. A middle of the pin 42 are exposed outward via the gap A. A top end of the cord 44 passes through the gap A and is engaged with the pin 42, and a bottom end of the cord 44 passes through the cord hole 14 of the plug 10.

Referring to FIG. 1 and FIG. 3 to FIG. 6, upon using the hole anchor 100, firstly the cord 44 is pulled downward to make the first side rod 32 and the second side rod 34 of the anchor head assembly 30 to simultaneously rotate around the pivot unit 36 to be in the inclined state. As the first recessed opening 327 and the second recessed opening 347 could receive a part of the anchor shaft 20, the anchor head assembly 30 could rotate to be in a state that a projection of both the first recessed opening 327 and the second recessed opening 347 overlaps with a projection of the part of the anchor shaft 20, thereby the anchor head assembly 30 could rotate to a greater rotating degree without being interfered by the anchor shaft 20.

Figure 7:
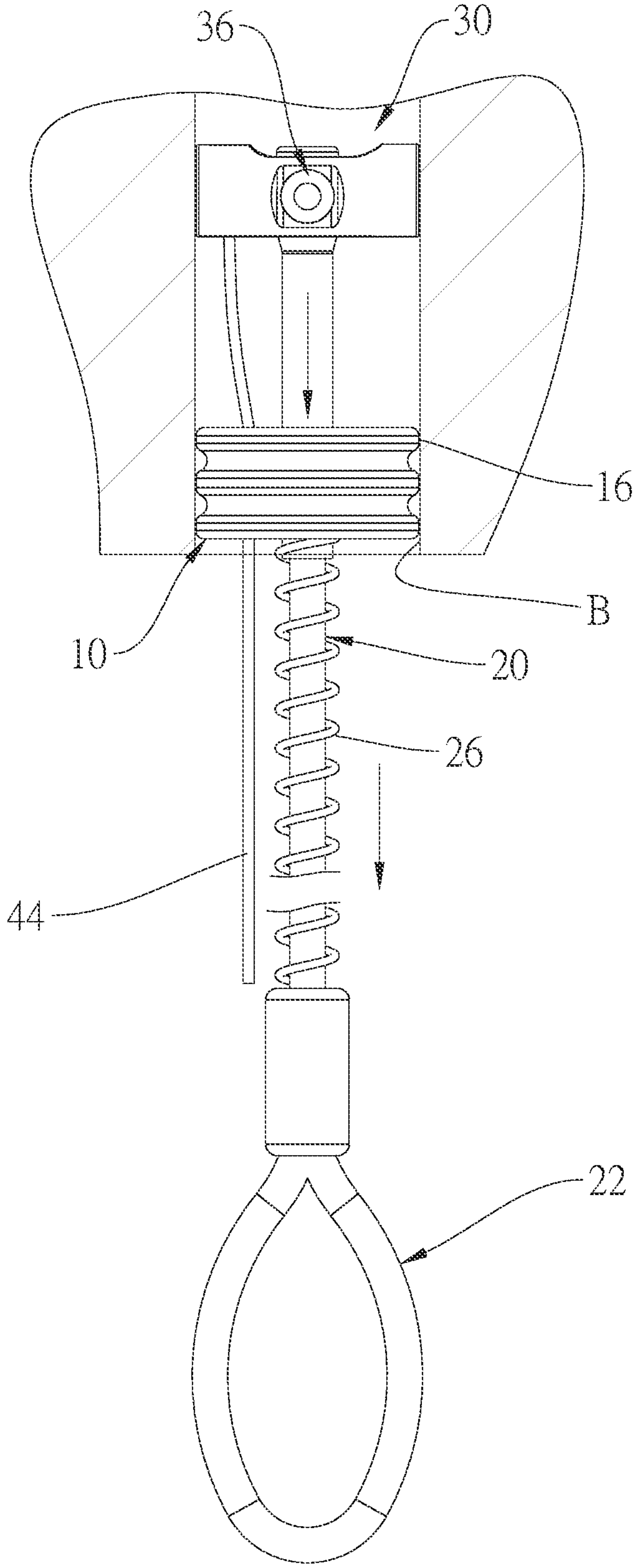
FIG. 7 is a schematic view, showing that the hole anchor according to the embodiment of the present invention is fixed in the hole.

Referring to FIG. 1 and FIG. 7, then the anchor head assembly 30 is placed in a hole B and the plug 10 is plugged into the hole B. When the plug 10 is a rubber cylinder, plugging the plug 10 into the hole B makes an outer diameter of the plug 10 smaller, at this time, a length of the first side rod 32 in the front-rear direction and a length of the second side rod 34 in the front-rear direction, which are originally identical to the outer diameter of the plug 10, are slightly greater than the outer diameter of the plug 10. Afterwards, the cord 44 is suitably manipulated to make the first side rod 32 and the second side rod 34 of the anchor head assembly 30 to rub against a hole wall of the hole B, and at the same time, the anchor shaft 20 is pulled in a direction away from the hole B, making the anchor head assembly 30 that is rubbing against the hole wall of the hole B to rotate to restore to the horizontal state, thereby making the anchor head assembly 30 to be stuck at the hole B for fixing, and the annular structure 22 is adapted to be engaged with a snap hook of a safety equipment.

As shown in FIG. 1 to FIG. 5, a slot 329 is recessed into a middle of an inner surface of the first closed end 321 facing the second side rod 34, and a fitting block 349 protrudes from a middle of an inner surface of the second closed end 341 facing the first side rod 32. The fitting block 349 fits in the slot 329 for fixing, making the second closed end 341 to be engaged with the first closed end 321 through such concave-convex structure, and thereby making a front-end surface of the second closed end 341 and a front-end surface of the first closed end 321 to form a complete flat surface.

The plug 10 is a rubber cylinder, and at least two protruding rings 16 are formed on an outer peripheral surface of the plug 10 and arranged at intervals along the top-bottom direction. In the current embodiment, when the first side rod 32 and the second side rod 34 of the anchor head assembly 30 are in the horizontal state, the length of the first side rod 32 in the front-rear direction and the length of the second side rod 34 in the front-rear direction are equal to the outer diameter of the plug 10. In other embodiments, the length of the first side rod 32 in the front-rear direction and the length of the second side rod 34 in the front-rear direction could be greater than the outer diameter of the plug 10.

The anchor shaft 20 includes an outer shaft 21 and an inner steel cable 23, wherein the outer shaft 21 passes through the through hole 12 of the plug 10. The head 24 is formed on a top end of the outer shaft 21. A bottom end of the outer shaft 21 has an insertion hole 211. A top end of the inner steel cable 23 is inserted into the insertion hole 211 and the outer shaft 21 is engaged with the inner steel cable 23 by welding or diameter reduction. A bottom end of the inner steel cable 23 is wound to form a closed ring shape and is fixed by a sleeving member 231 to be the annular structure 22. The bottom end of the spring 26 abuts against the sleeving member 231 of the annular structure 22.

It must be pointed out that the embodiments described above are only some preferred embodiments of the present invention. All equivalent structures which employ the concepts disclosed in this specification and the appended claims should fall within the scope of the present invention.

What is claimed is:

1. A hole anchor, comprising:

a plug, wherein a center and a periphery of the plug respectively have a through hole and a cord hole;

an anchor shaft passing through the through hole and having an annular structure on a bottom end and a head on a top end of the anchor shaft, wherein the head has an axial hole penetrating along a left-right direction; a spring fits around a periphery of the anchor shaft, wherein a top end and a bottom end of the spring respectively abut against the plug and the annular structure;

an anchor head assembly comprising a first side rod, a second side rod, and a pivot unit, wherein the first side rod and the second side rod are juxtaposed to each other; the first side rod has a first closed end and a first open end opposite to the first closed end, wherein a first recess is recessed into an inner surface of a middle of the first side rod facing the second side rod; a first hole penetrates through the middle of the first side rod along the left-right direction; a top side of the first open end has a first pin base, wherein an inner surface of the first pin base facing the second side rod has a first pin groove; a portion of the first open end adjacent to a bottom side of the first pin base has a first recessed opening;

the second side rod has a second closed end and a second open end opposite to the second closed end, wherein a second recess is recessed into an inner surface of a middle of the second side rod facing the first side rod; the head is disposed between the first recess and the second recess; the second closed end is engaged with the first closed end via a concave-convex structure; a second hole penetrates through the middle of the second side rod along the left-right direction; a top side of the second open end has a second pin base; a gap is formed between the second pin base and the first pin base; an inner surface of the second pin base facing the first side rod has a second pin groove; a portion of the second open end adjacent to a bottom side of the second pin base has a second recessed opening; the pivot unit pivotally penetrates through the first hole, the axial hole, and the second hole for fixing; and a guiding cord comprising a pin and a cord, wherein two ends of the pin respectively pass through the first pin groove and the second pin groove; a top end of the cord passes through the gap to be engaged with the pin, and a bottom end of the cord passes downward out of the cord hole of the plug.

2. The hole anchor as claimed in claim 1, wherein an outer surface of the first side rod away from the second side rod is a curved surface, and a middle of the outer surface of the first side rod has a first side recess; an inner side of the first side recess away from the second side rod is a flat surface; the first hole penetrates through the first side recess; an outer surface of the second side rod away from the first side rod is a curved surface, and a middle of the outer surface of the second side rod has a second side recess; an inner side of the second side recess away from the first side rod is a flat surface; the second hole penetrates through the second side recess.

3. The hole anchor as claimed in claim 2, wherein the pivot unit is a rivet having two fixing heads respectively on two opposite ends of the rivet; the two fixing heads are respectively engaged with the first side rod and the second side rod.

4. The hole anchor as claimed in claim 3, wherein the plug is a rubber cylinder, and at least two protruding rings are formed on an outer peripheral surface of the plug forms and arranged at intervals along a top-bottom direction perpendicular to the left-right direction; when the first side rod and the second side rod of the anchor head assembly are in a horizontal state, a length of the first side rod in a front-rear direction perpendicular to both the left-right direction and the top-bottom direction and a length of the second side rod in the front-rear direction are greater than or equal to an outer diameter of the plug.

5. The hole anchor as claimed in claim 4, wherein the anchor shaft comprises an outer shaft and an inner steel cable; the outer shaft passes through the through hole; the head is formed on a top end of the outer shaft; a bottom end of the outer shaft opposite to the head has an insertion hole; a top end of the inner steel cable is inserted into the insertion hole, and the outer shaft is engaged with the inner steel cable; a bottom end of the inner steel cable away from the head is wound to form a closed ring shape and is fixed by a sleeving member to be the annular structure; the bottom end of the spring abuts against the sleeving member.

6. The hole anchor as claimed in claim 1, wherein a slot is recessed into a middle of an inner surface of the first closed end facing the second side rod, and a fitting block protrudes from a middle of an inner surface of the second closed end facing the first side rod; the fitting block fits in the slot for fixing.

7. The hole anchor as claimed in claim 6, wherein the pivot unit is a rivet having two fixing heads respectively on two opposite ends of the rivet; the two fixing heads are respectively engaged with the first side rod and the second side rod.

8. The hole anchor as claimed in claim 7, wherein the plug is a rubber cylinder, and at least two protruding rings are formed on an outer peripheral surface of the plug forms and arranged at intervals along a top-bottom direction perpendicular to the left-right direction; when the first side rod and the second side rod of the anchor head assembly are in a horizontal state, a length of the first side rod in a front-rear direction perpendicular to both the left-right direction and the top-bottom direction and a length of the second side rod in the front-rear direction are greater than or equal to an outer diameter of the plug.

9. The hole anchor as claimed in claim 8, wherein the anchor shaft comprises an outer shaft and an inner steel cable; the outer shaft passes through the through hole; the head is formed on a top end of the outer shaft; a bottom end of the outer shaft opposite to the head has an insertion hole; a top end of the inner steel cable is inserted into the insertion hole, and the outer shaft is engaged with the inner steel cable; a bottom end of the inner steel cable away from the head is wound to form a closed ring shape and is fixed by a sleeving member to be the annular structure; the bottom end of the spring abuts against the sleeving member.

10. The hole anchor as claimed in claim 1, wherein the pivot unit is a rivet having two fixing heads respectively on two opposite ends of the rivet; the two fixing heads are respectively engaged with the first side rod and the second side rod.

11. The hole anchor as claimed in claim 10, wherein the plug is a rubber cylinder, and at least two protruding rings are formed on an outer peripheral surface of the plug and arranged at intervals along a top-bottom direction perpendicular to the left-right direction; when the first side rod and the second side rod of the anchor head assembly are in a horizontal state, a length of the first side rod in a front-rear direction perpendicular to both the left-right direction and the top-bottom direction and a length of the second side rod in the front-rear direction are greater than or equal to an outer diameter of the plug.

12. The hole anchor as claimed in claim 11, wherein the anchor shaft comprises an outer shaft and an inner steel cable; the outer shaft passes through the through hole; the head is formed on a top end of the outer shaft; a bottom end of the outer shaft opposite to the head has an insertion hole; a top end of the inner steel cable is inserted into the insertion hole, and the outer shaft is engaged with the inner steel cable; a bottom end of the inner steel cable away from the head is wound to form a closed ring shape and is fixed by a sleeving member to be the annular structure; the bottom end of the spring abuts against the sleeving member.

* * * * *